Jan. 1, 1924. 1,479,366
E. BUGATTI
ADJUSTABLE ARTICULATED OPERATING MECHANISM FOR CLUTCHES, BRAKES,
AND OTHER DEVICES
Filed Oct. 27, 1920 2 Sheets-Sheet 1

Inventor
Ettore Bugatti
By Henry Orth Jr. atty.

Patented Jan. 1, 1924.

1,479,366

UNITED STATES PATENT OFFICE.

ETTORE BUGATTI, OF MOLSHEIM, ALSACE, FRANCE.

ADJUSTABLE ARTICULATED OPERATING MECHANISM FOR CLUTCHES, BRAKES, AND OTHER DEVICES.

Application filed October 27, 1920. Serial No. 419,943.

*To all whom it may concern:*

Be it known that I, ETTORE BUGATTI, a subject of the King of Italy, residing at Molsheim, Alsace, France, have invented certain new and useful Improvements in Adjustable Articulated Operating Mechanism for Clutches, Brakes, and Other Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In his German Patent No. 203,453 of March 22, 1907, the applicant described an articulated operating mechanism for clutches or brakes, comprising two pairs of levers connected to the operating shifting sleeve by means of two straps disposed in the plane of the diameter of the said sleeve, which pair of levers operate two bent levers or bell cranks which are mounted symmetrically with reference to the shaft of the brake or the clutch and which act to throw on the device (brake or clutch) to be operated, upon the displacement of the shifting or sliding sleeve or collar. The ends of each lever carried a screw or threaded rod whose position is adjustable, each screw acting upon a push stud in contact with the movable clutch disks, in the case where the operating device is used for a clutch.

However, the applicant has since observed that this method of adjustment by means of symmetrically placed and independent screws is subject to a certain drawback, for in case one of the screws should be driven in more than the other, this will give rise to a dissymmetrical position of the entire assemblage, which in spite of the means provided for balancing the system, will occasion vibrations in the clutch and an irregular wear of the disks. On the other hand it is a somewhat difficult matter, especially where the operating device is mounted upon an automobile clutch, to provide proper access to the said adjusting screws.

In order to overcome these drawbacks, the applicant has now devised the adjustable articulated operating mechanism which is the subject of the present application of which the special feature consists in the fact that the adjustment is effected at the same time for both pairs of levers by the displacement of a ring disposed upon the shifting sleeve of the operating mechanism and suitably connected to the said bent levers or bell cranks. It results from this disposition that the amount of displacement of the end of each bent lever or bell-crank during the adjustment thereof is absolutely identical, and hence the symmetrical relation of the articulated system is maintained.

The following description together with the accompanying drawings which are given by way of example, sets forth a practical embodiment of the invention.

The cover $k$ of the clutch E carries the push studs $o$ upon which rest the ends $m^1$ of the bent levers or bell cranks $h$ which are journaled at $l$. The said ends $m^1$ can be constituted for instance by independent pieces which are riveted screwed or otherwise fixed into the lever $h$ and are provided with heads $n^1$ which contact with the ends of the push studs $o$. The other end $m^2$ of each of the bent levers $h$ is articulated on a shaft $f$ upon whose ends are articulated the pairs of levers $e\ e$ disposed in pairs and situated in different planes.

The levers $e$ are journaled upon the shaft ends $d^1$ forming part of a ring $p$ mounted upon the sleeve $q$ which is adapted to rotate with the hollow shaft $r$, this latter being in solid connection with the cover piece $k$ of the clutch and having rotating therein the universal joint shaft $x$; the sleeve $q$ can however be displaced longitudinally with reference to the shaft $r$, and it is mounted for instance by keying it along this latter. A ball bearing is interposed between the sleeve $q$ and the shifting sleeve $a$ whose axial displacement acts to throw on the clutch.

The shafts $l$ are maintained within a supporting sleeve $s$ which has a tendency to separate from the cover piece $k$ by the action of the coiled springs $t$ which are provided in suitable number. This supporting sleeve is pressed by means of the said springs $t$ against a ring $u$ which constitutes the adjustable member of the articulated clutch operating mechanism. The ring $u$ can be screwed more or less upon the threaded part $v$ of the hollow shaft $r$ which is solidly connected to the clutch.

It will be understood that when the ring $u$ is displaced (upwardly in the case of Fig. 1) along the hollow shaft $r$, for instance by screwing the said ring $u$ upon the threaded portion $v$, this ring $u$ will drive before it the sliding sleeve $s$ thus acting upon the levers $h$, and this will allow of taking up the play caused for instance by the wear of the clutch disks.

Figure 1:
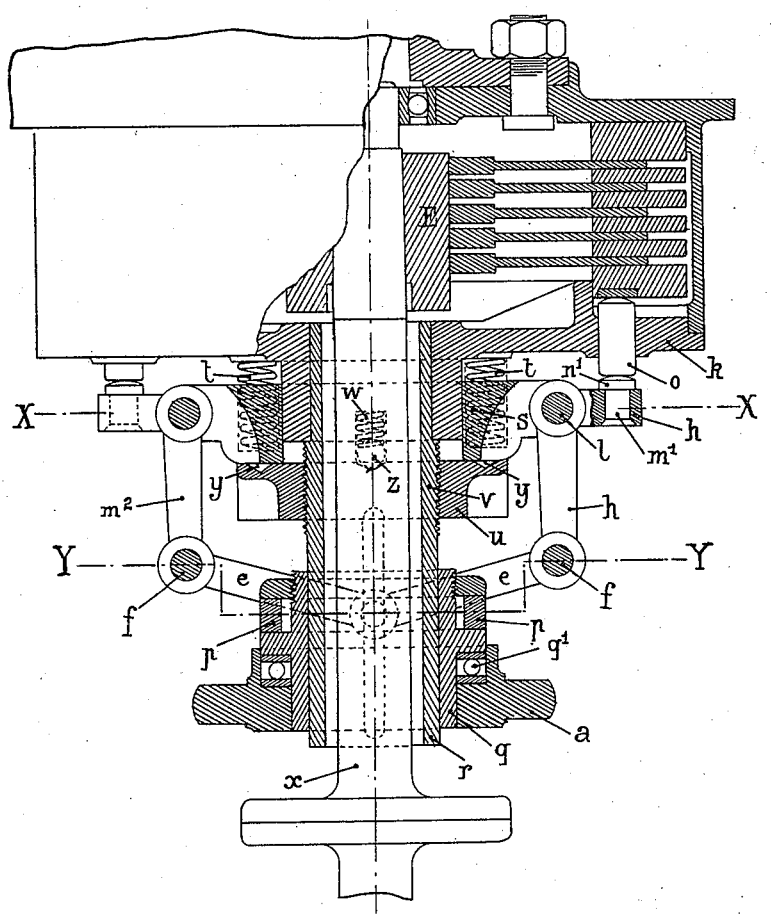
Fig. 1 represents in longitudinal section and in partial elevation, a clutch operated by the adjustable articulated mechanism.
Figure 2:
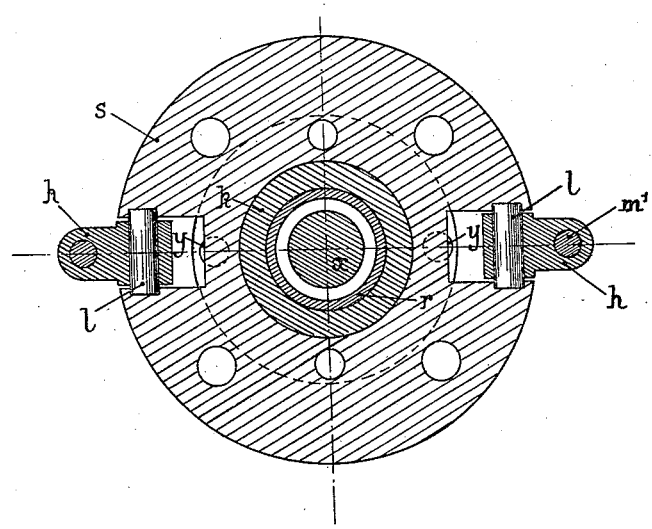
Fig. 2 is a cross-section along the line X—X of Fig. 1.
Figure 3:
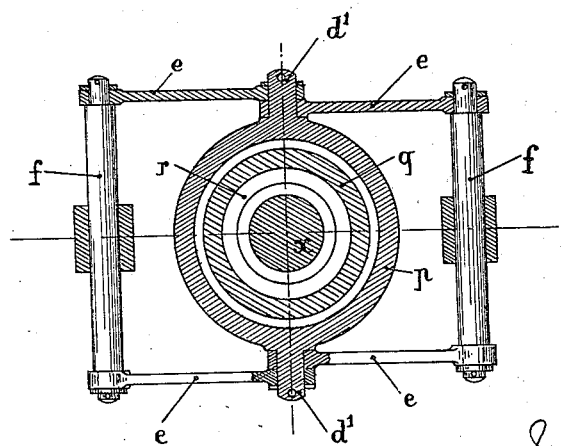
Fig. 3 is a cross-section along the line Y—Y of Fig. 1.

On the contrary, when the ring $u$ is unscrewed, that is when it is downwardly displaced in the case of Fig. 1, the springs $t$ will now displace the sliding sleeve $s$ in the downward direction until it comes in contact with the ring $u$.

The upper surface of the ring $u$ may be provided with a circularly-disposed series of holes $y$ into any one of which may be driven the ball $z$ pushed by the spring $w$ which is disposed within the sliding sleeve.

The operation of the clutch is affected by upwardly displacing the shifting sleeve $a$, in the case of Fig. 1, which carries with it the collar $p$, and this latter acts through the pairs of levers $e$ to effect the outward movement of the ends $m^2$ of the levers $h$ which are articulated upon the shafts $f$; this causes a pivoting movement of the levers $h$ and their other extremities $m^1$ will thereupon drive in the push studs $o$ and throw on the clutch.

The clutch is thrown off by the contrary movement, by the displacement of the shifting sleeve $a$ (downwardly as in the case of Fig. 1).

It will be observed from the foregoing considerations that the adjustment is carried out by means of a central member which causes the displacement of the two bent levers $h$ at the same time and it will be therefore impossible for the articulated mechanism to be de-centred with reference to the axis. This adjustment is easily made and can be very rapidly effected.

It is of course understood that the present invention is not limited to the foregoing devices, and that the improved articulated adjusting mechanism can be applied for any other purpose outside of a clutch.

Having thus described the nature of the said invention and the best means I know of carrying the same into practical effect, I claim.

An adjustable articulated operating mechanism for clutches comprising a casing, disk elements contained in the casing, push pieces adapted to act through the wall of the casing, two pivoted symmetrically disposed bell-crank levers adapted to press upon the push pieces, a hollow shaft, an adjustment ring screwing upon the hollow shaft, articulation shafts for the bell-crank levers, a sleeve carrying the articulation shafts carried with the ring during the movement of the latter, elastic means provided between the casing and the sleeve, links adapted to act upon the other ends of the bell crank levers, a ring serving as an attaching point for the links, and a sleeve supporting the ring for the operation of the clutch.

In testimony that I claim the foregoing as my invention, I have signed my name.

ETTORE BUGATTI.

Witness:
D. C. WOODS.